United States Patent
Lai et al.

(10) Patent No.: US 9,081,725 B2
(45) Date of Patent: *Jul. 14, 2015

(54) DIGITAL INFORMATION PROTECTING METHOD AND APPARATUS, AND COMPUTER ACCESSIBLE RECORDING MEDIUM

(71) Applicant: Shansun Technology Company, Taichung (TW)

(72) Inventors: Jing-Shiun Lai, Taichung (TW); Ling-Ying Nain, Taichung (TW); Po-Hsu Lin, Taichung (TW); Sheng-Kai Lin, Taichung (TW)

(73) Assignee: SHANSUN TECHNOLOGY COMPANY, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,300

(22) Filed: Nov. 4, 2013

(65) Prior Publication Data
US 2014/0095892 A1  Apr. 3, 2014

Related U.S. Application Data

(63) Continuation-in-part of application No. 13/096,183, filed on Apr. 28, 2011, now abandoned, which is a continuation of application No. 11/820,082, filed on Jun. 18, 2007, now Pat. No. 7,958,374, which is a continuation-in-part of application No. 10/103,254, filed on Mar. 19, 2002, now abandoned.

(51) Int. Cl.
*G06F 12/14* (2006.01)
*G06F 21/85* (2013.01)
*G06F 21/78* (2013.01)

(52) U.S. Cl.
CPC ........ *G06F 12/1408* (2013.01); *G06F 12/1441* (2013.01); *G06F 21/78* (2013.01); *G06F 21/85* (2013.01); *G06F 2221/2107* (2013.01)

(58) Field of Classification Search
None
See application file for complete search history.

(56) References Cited

U.S. PATENT DOCUMENTS 3,781,808 A   12/1973   Ahearn
3,976,980 A    8/1976   Hertz
(Continued)

FOREIGN PATENT DOCUMENTS

JP   H11-045212    2/1999
JP   2002-351742  12/2002
(Continued)

OTHER PUBLICATIONS

Office Action dated Jan. 22, 2013 for related Japanese Patent Application No. 2008-159551 and an English summary thereof.
(Continued)

*Primary Examiner* — Gilberto Barron, Jr.
*Assistant Examiner* — Abdulhakim Nobahar
(74) *Attorney, Agent, or Firm* — Ladas & Parry, LLP

(57) ABSTRACT

In a method for protecting digital information, a processor converts a protected address range into a plurality of address blocks of a storage device based on a preset conversion unit, and generates an address block rearranging rule using the address blocks as a parameter. When it is desired to load data into a space of an address batch of the protected address range, the processor converts the address batch into a plurality of address blocks based on the conversion unit, locates rearranged addresses of the address blocks in the protected address range according to the address block rearranging rule, and loads the data into spaces of the rearranged addresses.

24 Claims, 12 Drawing Sheets

(56) References Cited

U.S. PATENT DOCUMENTS

| | | | |
|---|---|---|---|
| 4,394,642 | A | 7/1983 | Currie |
| 4,602,350 | A | 7/1986 | Gray |
| 4,780,905 | A * | 10/1988 | Cruts et al. .................. 380/44 |
| 4,953,122 | A | 8/1990 | Williams |
| 5,293,596 | A | 3/1994 | Toyokura |
| 5,396,619 | A | 3/1995 | Walton |
| 5,428,685 | A | 6/1995 | Kadooka |
| 5,577,231 | A | 11/1996 | Scalzi |
| 5,586,256 | A | 12/1996 | Thiel |
| 5,628,023 | A | 5/1997 | Bryant |
| 5,732,404 | A | 3/1998 | Johnson |
| 5,937,435 | A | 8/1999 | Dobbek |
| 6,014,731 | A | 1/2000 | Totsuka |
| 6,205,531 | B1 | 3/2001 | Hussain |
| 6,240,484 | B1 | 5/2001 | Witt |
| 6,393,564 | B1 | 5/2002 | Kanemitsu |
| 6,430,669 | B1 | 8/2002 | Suzuki |
| 6,473,861 | B1 | 10/2002 | Stokes |
| 6,532,528 | B1 | 3/2003 | Nishimoto |
| 6,606,707 | B1 | 8/2003 | Hirota |
| 6,789,156 | B1 | 9/2004 | Waldspurger |
| 6,851,056 | B2 | 2/2005 | Evans |
| 7,117,373 | B1 * | 10/2006 | Trimberger et al. .......... 713/193 |
| 7,334,124 | B2 * | 2/2008 | Pham et al. .................. 713/162 |
| 2003/0046563 | A1 * | 3/2003 | Ma et al. ..................... 713/190 |
| 2003/0182564 | A1 | 9/2003 | Lai |
| 2004/0107356 | A1 | 6/2004 | Shamoon |
| 2004/0218214 | A1 | 11/2004 | Kihara |
| 2007/0067644 | A1 * | 3/2007 | Flynn et al. .................... 713/189 |
| 2007/0116278 | A1 * | 5/2007 | Asano et al. .................. 380/203 |
| 2007/0250719 | A1 | 10/2007 | Lai |

FOREIGN PATENT DOCUMENTS

| | | |
|---|---|---|
| JP | 2005-149262 | 6/2005 |
| JP | 2009-25812 | 2/2009 |

OTHER PUBLICATIONS

D.E Knuth, The Art of Computer Programming, vol. 2/Seminumerical Algorithms, 1997, $3^{rd}$ edition, Addison Wesley, Ch. 3, pp. 10-11.

Office Action dated Dec. 20, 2006 for related U.S. Appl. No. 10/103,254.

Office Action dated Apr. 4, 2006 for related U.S. Appl. No. 10/103,254.

Office Action dated Oct. 19, 2005 for related U.S. Appl. No. 10/103,254.

Office Action dated Oct. 1, 2010 for related U.S. Appl. No. 11/820,082.

Office Action dated Jun. 4, 2013 for related U.S. Appl. No. 13/096,183.

Office Action Nov. 1, 2012 for related U.S. Appl. No. 13/096,183.

Office Action dated May 10, 2012 for related U.S. Appl. No. 13/096,183.

* cited by examiner

FIG. 4

| Default address | 0 | 1 | 2 | 3 | 4 | ... | 996 | 997 | 998 | 999 | 1000 ←70 |
|---|---|---|---|---|---|---|---|---|---|---|---|
| Customized address | 1000 | 999 | 998 | 997 | 996 | ... | 4 | 3 | 2 | 1 | 0 ←75 |

FIG. 5

| Address conversion key | | a | | 1 | | K | | 9 | | (unused) | (unused) ←CNV_key |
|---|---|---|---|---|---|---|---|---|---|---|---|
| ASCII character code | | 97 | | 49 | | 75 | | 57 | | 128 | 128 |
| Default address | 0 | 1 | ... | 96 | 97 | ... | 145 | 146 | ... | 220 | 221 | ... | 277 | 278 | ... | 499 ←70 |
| Customized address | 96 | 95 | ... | 0 | 145 | ... | 97 | 220 | ... | 146 | 277 | ... | 221 | 405 | ... | 406 ←75 |

DIGITAL INFORMATION PROTECTING METHOD AND APPARATUS, AND COMPUTER ACCESSIBLE RECORDING MEDIUM

CROSS-REFERENCE TO RELATED APPLICATION

This application is a continuation-in-part of U.S. patent application Ser. No. 13/096,183 filed on Apr. 28, 2011, which is a continuation of U.S. patent application Ser. No. 11/820,082 filed on Jun. 18, 2007, which is a continuation-in-part of U.S. patent application Ser. No. 10/103,254 filed on Mar. 19, 2002, the contents of which are hereby incorporated by reference in their entirety.

BACKGROUND OF THE INVENTION

1. Field of the Invention

The invention relates to a data protecting method and an apparatus, more particularly to a method and an apparatus for protecting digital information, which can prevent unauthorized access to digital information.

2. Description of the Related Art

With the advance of computer technology, almost all government organizations, research centers, academic institutes, and companies now use computers to prepare documents and establish files. In addition, with the fast development of computer peripheral storage equipment, they are now used to store important documents, file data, technical data, confidential data, and backup copies of the data, etc. Use of storage devices to store documents or files not only can shorten the time to create and locate data, but also can reduce use of paper and increase the lifetime of stored data. Moreover, since portable storage devices are easy to store, convenient to carry, and compact, users are accustomed to using portable storage devices to store data and backup data. However, the convenience provided by portable storage devices increases risks of leakage of data stored in a computer. To overcome the aforesaid drawback, various methods of protecting data using encryption have been proposed. Nonetheless, since encrypted data may still be cracked by processing the encrypted data in a number of computers and doing a large number of calculations, how to enhance data security so that protected data cannot be recovered after being stolen is a subject of primary concern.

SUMMARY OF THE INVENTION

Therefore, an object of the present invention is to provide a digital information protecting method so that the protected digital information cannot be easily recomposed and recovered.

According to one aspect of the invention, a method for protecting digital information comprises:

converting, using a processor, a protected address range into a plurality of address blocks of a storage device based on a preset conversion unit, and generating an address block rearranging rule using the address blocks as a parameter;

when it is desired to load data into a space of an address batch of the protected address range, converting, using the processor, the address batch into a plurality of address blocks based on the conversion unit; and locating, using the processor, rearranged addresses of the address blocks in the protected address range according to the address block rearranging rule, and loading, using the processor, the data into spaces of the rearranged addresses;

wherein, the conversion unit has a size of (n) bits, where (n) is a positive integer, and the size of the conversion unit is smaller than a size of an address.

According to another aspect of the invention, a method for protecting digital information comprises:

converting, using a processor, a protected address range into a plurality of address blocks of a storage device based on a preset conversion unit, and generating an address block rearranging rule using the address blocks as a parameter;

when it is desired to load data into a space of an address batch of the protected address range, converting, using the processor, the address batch into a plurality of address blocks based on the conversion unit; and locating, using the processor, rearranged addresses of the address blocks in the protected address range according to the address block rearranging rule, and loading, using the processor, the data into spaces of the rearranged addresses.

The data loaded into the spaces of the rearranged addresses is encrypted using an encryption algorithm and an encryption code, and includes a plurality of encrypted data segments each having a size of (n) bytes.

The encryption algorithm is configured to encrypt (n) bytes of the data at a time, where n is a positive integer larger than 2. In loading the data into spaces of the rearranged addresses, the processor is configured to load the encrypted data segments separately into spaces of the rearranged addresses.

BRIEF DESCRIPTION OF THE DRAWINGS

Other features and advantages of the present invention will become apparent in the following detailed description of the preferred embodiments with reference to the accompanying drawings, of which:

FIG. 4 illustrates a protected zone address mapping table constructed using a set address conversion rule in the preferred embodiment of the present invention;

FIG. 5 illustrates a protected zone address mapping table constructed using another set address conversion rule in the preferred embodiment of the present invention;

DETAILED DESCRIPTION OF THE PREFERRED EMBODIMENTS

Figure 1:
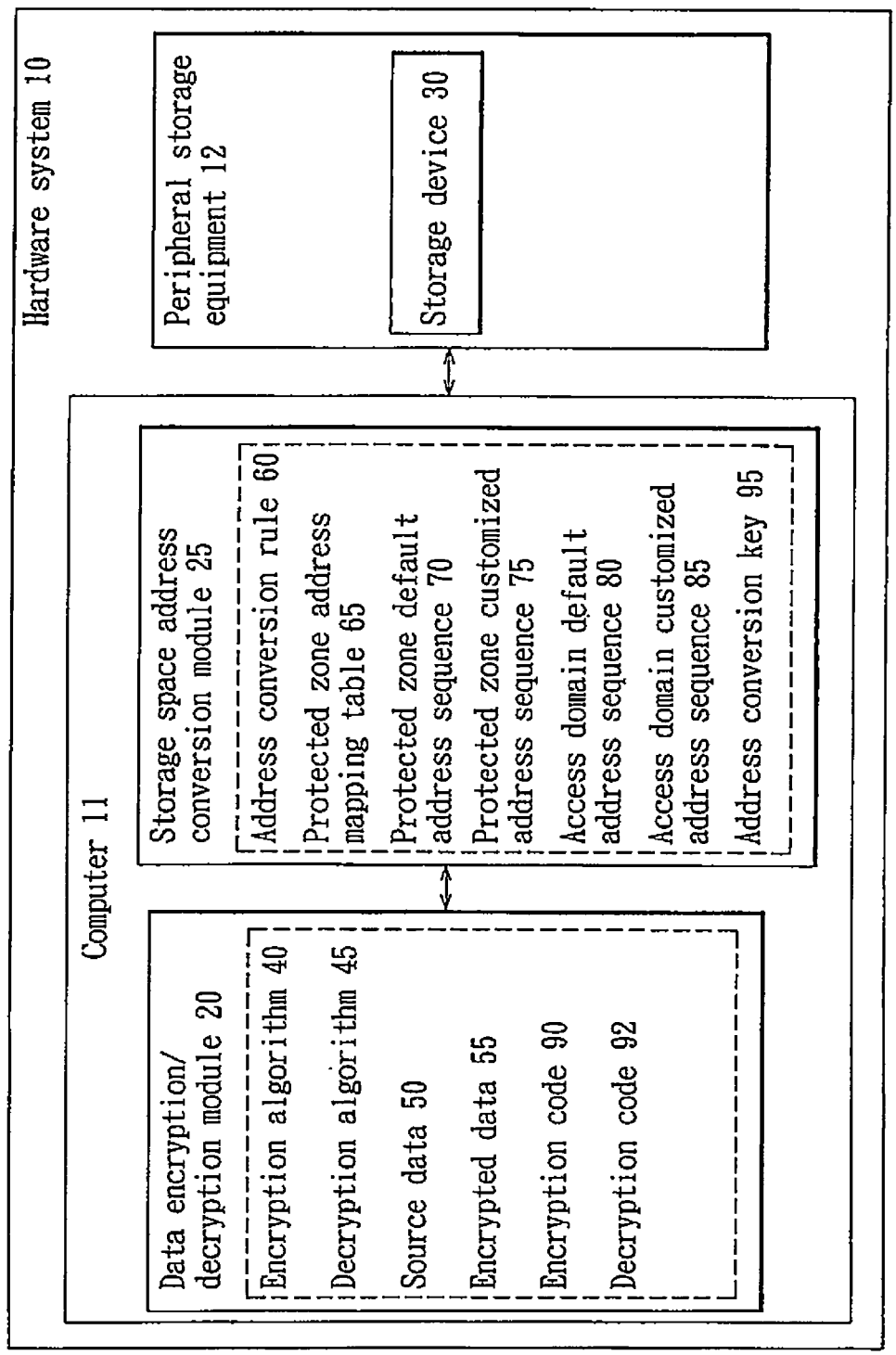
FIG. 1 is a diagram showing primary function blocks of a preferred embodiment of the present invention.

Before the present invention is described in greater detail, it should be noted that like elements are denoted by the same reference numerals throughout the disclosure.

Figure 2:
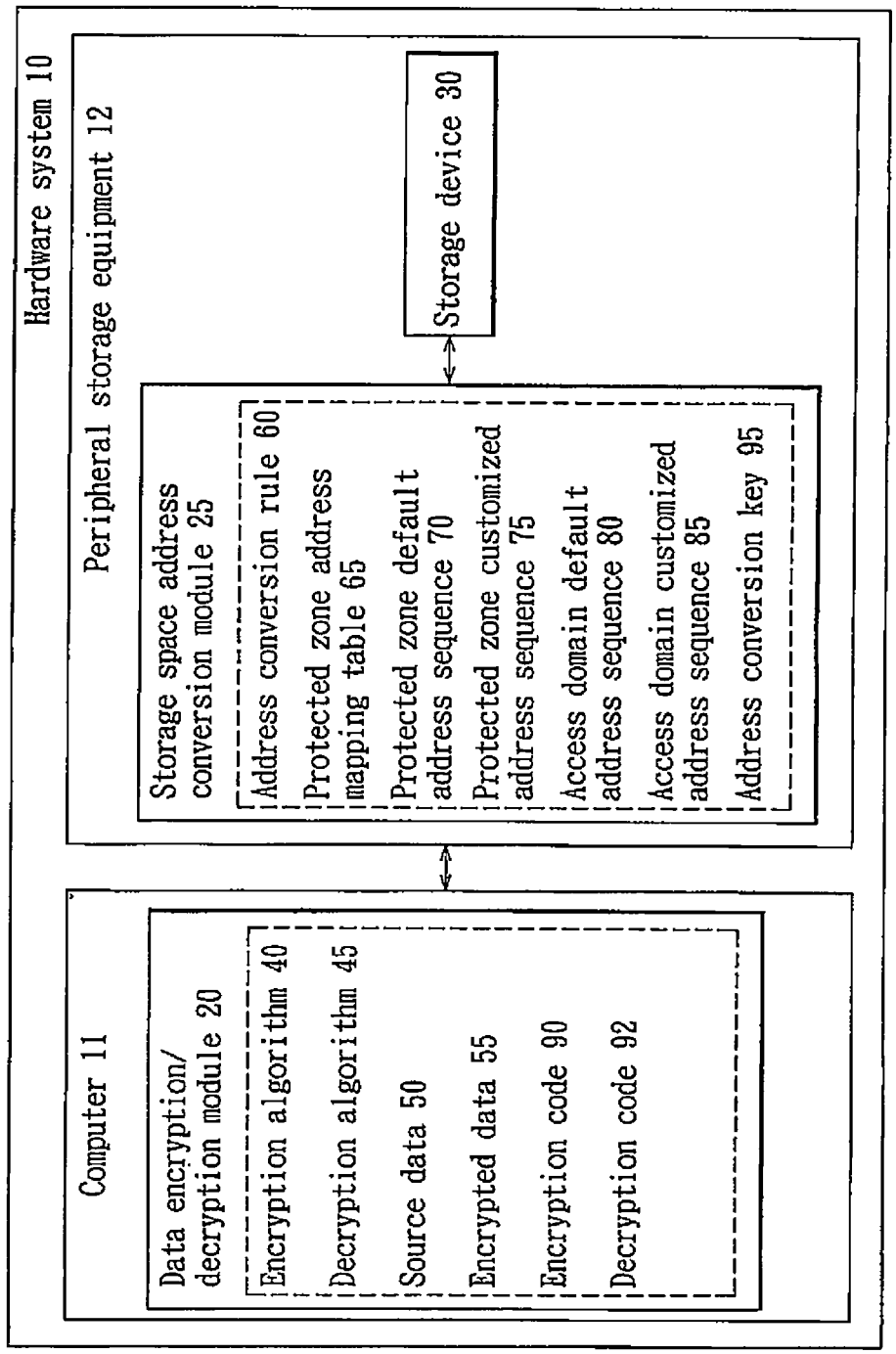
FIG. 2 is a diagram showing primary function blocks of another preferred embodiment of the present invention.
Figure 3:
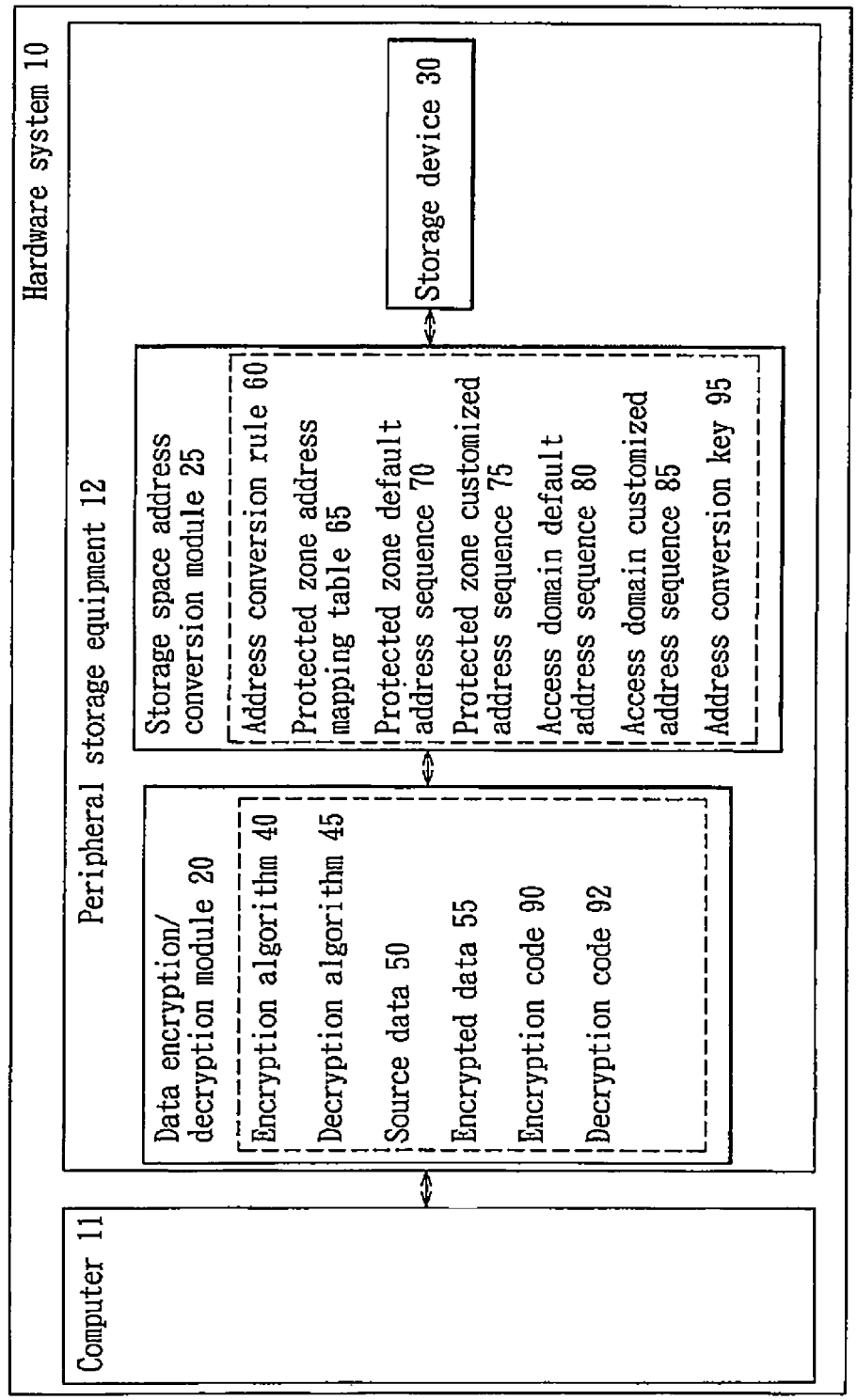
FIG. 3 is a diagram showing primary function blocks of still another preferred embodiment of the present invention.

FIG. 1 shows a primary function block diagram of the first preferred embodiment of this invention, in which a hardware system 10 comprises a computer 11 that includes a data encryption/decryption module 20 and a storage space address conversion module 25, and peripheral storage equipment 12 that includes a storage device 30. FIG. 2 shows a primary function block diagram of the second preferred embodiment of the present invention, in which the hardware system 10 comprises a computer 11 that includes a data encryption/decryption module 20, and peripheral storage equipment 12 that includes a storage space address conversion module 25 and a storage device 30. FIG. 3 shows a primary function block diagram of the third preferred embodiment of the present invention, in which the hardware system 10 includes a computer 11, and peripheral storage equipment 12 that includes a data encryption/decryption module 20, a storage space address conversion module 25, and a storage device 30.

The storage space address conversion module 25 provides the following functions: (1) setting an address conversion rule 60 according to an address conversion key 95 and a protected zone default address sequence 70, and using the address conversion rule 60 to construct a protected zone address mapping table 65, which converts the protected zone default address sequence 70 into a protected zone customized address sequence 75; and (2) using the protected zone address mapping table 65 to obtain an access domain customized address sequence 85 corresponding to an access domain default address sequence 80; or according to the address conversion rule 60, performing calculations to obtain the access domain customized address sequence 85 corresponding to the access domain default address sequence 80.

The data encryption/decryption module 20 provides the following functions: (1) encrypting source data 50 into encrypted data 55 according to an encryption code 90 and an encryption algorithm 40; and (2) decrypting the encrypted data 55 into the source data 50 according to a decryption code 92 and a decryption algorithm 45.

When data is to be stored in a protected zone of the storage device 30, the data encryption/decryption module 20 is used to encrypt the source data 50 into the encrypted data 55, and the storage space address conversion module 25 is then used to obtain the access domain customized address sequence 85 to which the system-specified access domain default address sequence 80 corresponds. Subsequently, the encrypted data 55 is stored in storage positions corresponding to the access domain customized address sequence 85. On the other hand, when data is to be read, the storage space address conversion module 25 is used to obtain the access domain customized address sequence 85 to which the system-specified access domain default address sequence 80 corresponds, and the encrypted data 55 is then read from the storage positions corresponding to the access domain customized address sequence 85. Subsequently, the encryption/decryption module 20 is used to decrypt the encrypted data 55 into the source data 50.

The foregoing gives an outline of the primary functions of the present invention. An initialization process employing a digital information protecting apparatus of the present invention is described as follows:

The storage space address conversion module 25 is used to decide the address conversion rule 60 according to the address conversion key 95 and the protected zone default address sequence 70 (Pi, i=0, 1, . . . , n) of a zone to be protected in the storage device 30. The address conversion rule 60 is used to construct the protected zone address mapping table 65, which converts the protected zone default address sequence 70 (Pi, i=0, 1, . . . , n) into the protected zone customized address sequence 75 (Si, i=0, 1, . . . , n). The address conversion rule 60 is realized by employing a function which uses the address conversion key 95 and the protected zone default address sequence 70 (Pi, i=0, 1, . . . , n) as parameters, and the function must satisfy a one-to-one mapping condition in the definition region (Pi, i=0, 1, . . . , n) to the value region (Si, i=0, 1, . . . , n). Several schemes of generating the function are set forth below for the purpose of illustration:

(A) Using only the protected zone address range as parameter. Referring to FIG. 4, the protected zone default address sequence 70 is (0, 1, . . . , 1000), and the range of the addresses therein is therefore 0~1000. The address conversion rule 60 can be set as:

f(x)=1000−x.

Therefore, the protected zone default address sequence 70 (0, 1, . . . , 1000) is converted into the protected zone customized address sequence 75 (1000, 999, . . . , 0) according to the address conversion rule 60.

(B) Using the address conversion key 95 and the protected zone address range as parameters. Referring to FIG. 5, the protected zone default address sequence 70 is (0, 1, . . . , 499), and the address conversion key 95 is "a1K9", i.e., the address conversion ASCII character code is 97-49-75-57. The character code sequence is extended using 128, which is not in use, thereby forming a character code sequence of 97-49-75-57-128-128-128-128 . . . . The address conversion rule 60 is thus set to be:

$$f(x) \begin{cases} 96-x & \text{if } 0 \le x < 97 \\ 145-x+97 & \text{if } 97 \le x < 146 \\ 220-x+146 & \text{if } 146 \le x < 221 \\ 277-x+221 & \text{if } 221 \le x < 278 \\ 405-x+278 & \text{if } 278-x < 406 \\ 499-x+406 & \text{if } 406 \le x < 500 \end{cases}$$

Therefore, the address conversion rule 60 is used to convert the protected zone default address sequence 70 (0, 1, . . . , 96 . . . , 145 . . . , 220, . . . , 227, . . . , 499) into the protected zone customized address sequence 75 (96, 95, . . . , 0 . . . , 97 . . . , 146, . . . , 221, . . . , 406).

The procedure and steps employed by the digital information protecting apparatus to store data in the protected zones of the storage device 30 are described as follows:

1. The data encryption/decryption module 20 is used to encrypt the source data 50 (Di, i=0, 1, . . . , m) into the encrypted data 55 (Ri, i=0, 1, . . . , k). The total length of the source data 50 is greater than or equal to the total length of the encrypted data 55. The data to be stored does not have recognizable continuity so that correct and complete reading of the stored data with recognizable continuity can be prevented, thereby enhancing protection of the stored data. This will be illustrated using the following encryption algorithm:

The encryption code 90 is set to be "SSun," and the encryption ASCII character code thereof will be 0x53-0x53-0x75-0x6E. Using a symmetrical algorithm, the encryption algorithm 40 is set to be:

$X_i = X_i \char`\^ X_{i-1}$ if $i \ne 0$ $X_i \char`\^ 0x5353756E$ if $i=0$ where i is 8 to 0, "^" represents an "exclusive or" operation, and Xi has a length unit of 32 bits.

Figures 6, 7:
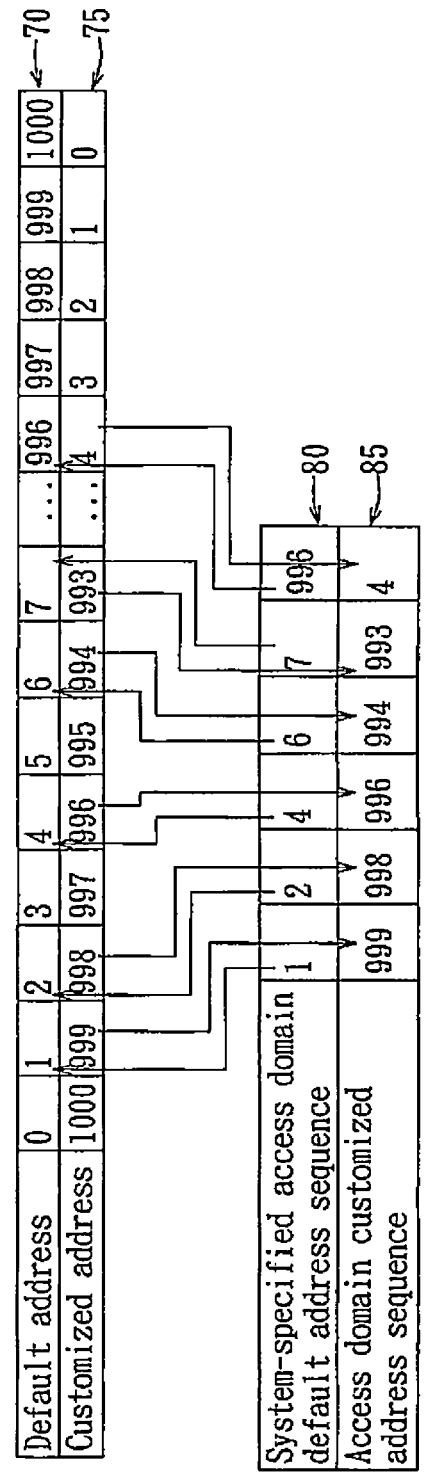
FIG. 6 schematically illustrates an example of encrypting source data using an encryption algorithm and decrypting encrypted data into the source data using a decryption algorithm.
FIG. 7 schematically illustrates how a system-specified access domain default address sequence is converted into an access domain customized address sequence in the preferred embodiment of the present invention.

Referring to FIG. 6, the encryption algorithm 40 is used to encrypt the source data 50 (0x645BCF98, 0x6839274D, 0x4B652188, ..., 0x7890123E) into the encrypted data 55 (0x3708BAF6, 0x0C62E8D5, 0x235C06C5, ..., 0x5EA5B9CC).

2. Using the storage space address conversion module 25, and according to the protected zone address mapping table 65 or by directly using the address conversion rule 60, the system-specified access domain default address sequence 80 (Ui, i=0, 1, ..., x) is converted into the access domain customized address sequence 85 (Vi, i=0, 1, ..., x), which is subsequently stored sequentially. Referring to FIG. 7, the address conversion rule 60 and the protected zone address mapping table 65 are the same as those shown in FIG. 4. The system-specified access domain default address sequence 80 (1, 2, 4, 6, 7, 996) is converted into the access domain customized address sequence 85 (999, 998, 996, 994, 993, 4). Therefore, the encrypted data 55 (Ri, i=0, 1, 2, ..., k) will be stored at storage positions to which the access domain customized address sequence 85 (999, 998, 996, 994, 993, 4) correspond.

The procedure and steps involved when reading the data in the protected zones of the storage device 30 are described as follows:

1. Using the storage space address conversion module 25, and according to the protected zone address mapping table 65 or by directly using the address conversion rule 60, the system-specified access domain default address sequence 80 (Ui, i=0, 1, ..., x) is converted into the access domain customized address sequence 85 (Vi, i=0, 1, ..., x). Referring to FIG. 7, the address conversion rule 60 and the protected zone address mapping table 65 are the same as those shown in FIG. 4, and the access domain default address sequence 80 (1, 2, 4, 6, 7, 996) that is specified by the system to be read is converted into the access domain customized address sequence 85 (999, 998, 996, 994, 993, 4). Therefore, the encrypted data 55 (Ri, i=0, 1, ..., k) is read from the storage positions corresponding to the access domain customized address sequence 85 (999, 998, 996, 994, 993, 4).

2. After reading the encrypted data 55 (Ri, i=0, 1, ..., k) according to the access domain customized address sequence 85 (Vi, i=0, 1, ..., x), the encrypted data 55 (Ri, i=0, 1, ..., k) is decrypted into the source data 50 (Di, i=0, 1, ..., m) using the data encryption/decryption module 20 and according to the decryption code 92 and the decryption algorithm 45. This will be illustrated using the following decryption algorithm:

The decryption code 92 is set to be "SSun," and the decryption ASCII character code thereof will be 0x53-0x53-0x75-0x6E. Employing a symmetrical algorithm, the decryption algorithm 45 is set to be:

$Xi = Xi \hat{} 0x5353756E$ if $i=0$ $Xi \hat{} Xi-1$ if $i \neq 0$ where i is 0 to 8, "^" represents an "exclusive or" operation, and Xi has a length unit of 32 bits.

Referring to FIG. 6, the encrypted data 55 (0x3708baf6, 0x0c62e8d5, 0x235c06c5, 0x5ea5b9 cc) is decrypted into the source data 50 (0x645bcf98, 0x6839274d, 0x4b652188, ..., 0x7890123e) using the decryption algorithm 45.

Figure 8:
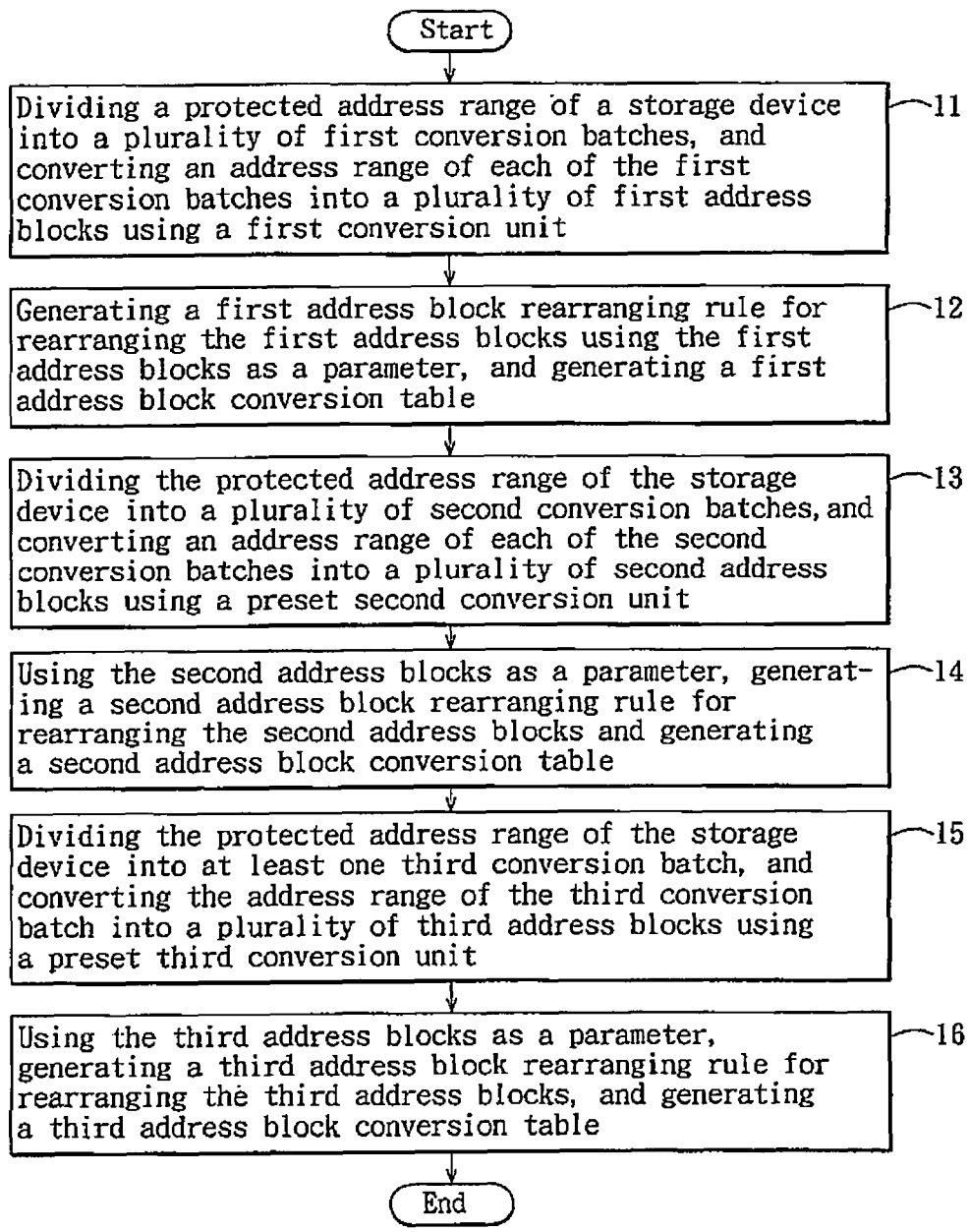
FIG. 8 is a preparation operation flowchart of another preferred embodiment of a digital information protecting method according to the present invention.
Figure 9:
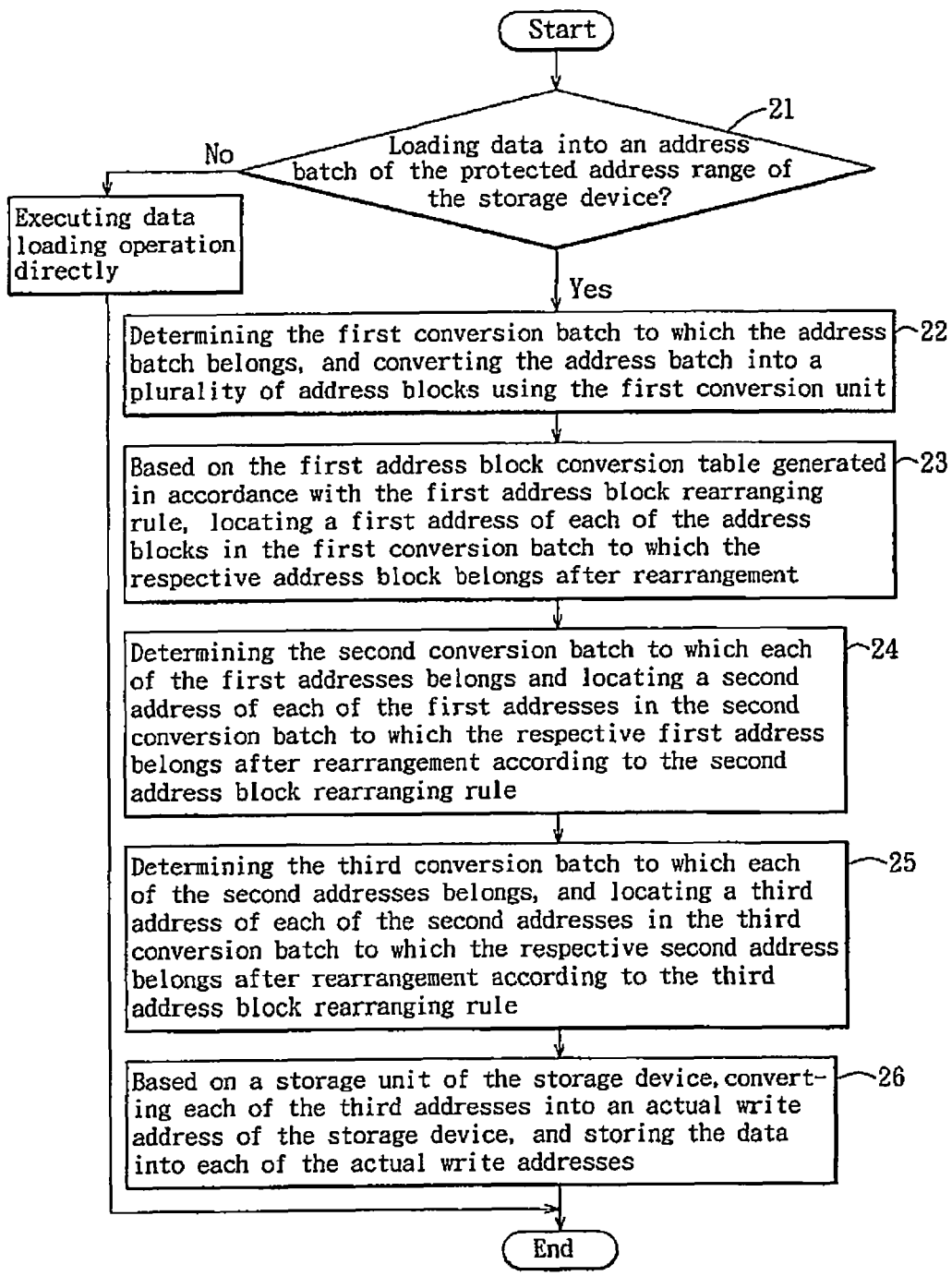
FIG. 9 is an actual access operation flowchart of the preferred embodiment.

FIGS. 8 and 9 show another preferred embodiment of the digital information protecting method according to the present invention. This embodiment is implemented in the form of a computer software program stored in a computer accessible recording medium of a digital information protecting apparatus (such as a computer system) so as to protect digital information stored in a storage device, such as a hard disk. The procedure and steps of executing digital information protection through the computer software program of this embodiment will be described below with reference to FIGS. 8 and 9.

It is first supposed that the size of each storage address is 1 byte, and the basic storage unit of the storage device is 512 bytes (i.e., 1 sector). The protected address range of the storage device is from the $2048^{th}$ to the $20973568^{th}$ byte, which is a total of 20971520 bytes.

In this embodiment, the program is divided into a preparation operation as shown in FIG. 8 and an actual access operation as shown in FIG. 9. In the preparation operation shown in FIG. 8, three address conversion rules are first generated through the program according to three different conversion units. Three address conversions are then performed on the address to be accessed in the subsequent actual access operation (as shown in FIG. 9) according to the three address conversion rules thus generated.

Preparation Operation (see FIG. 8)

1. First Address Conversion

Figure 10:
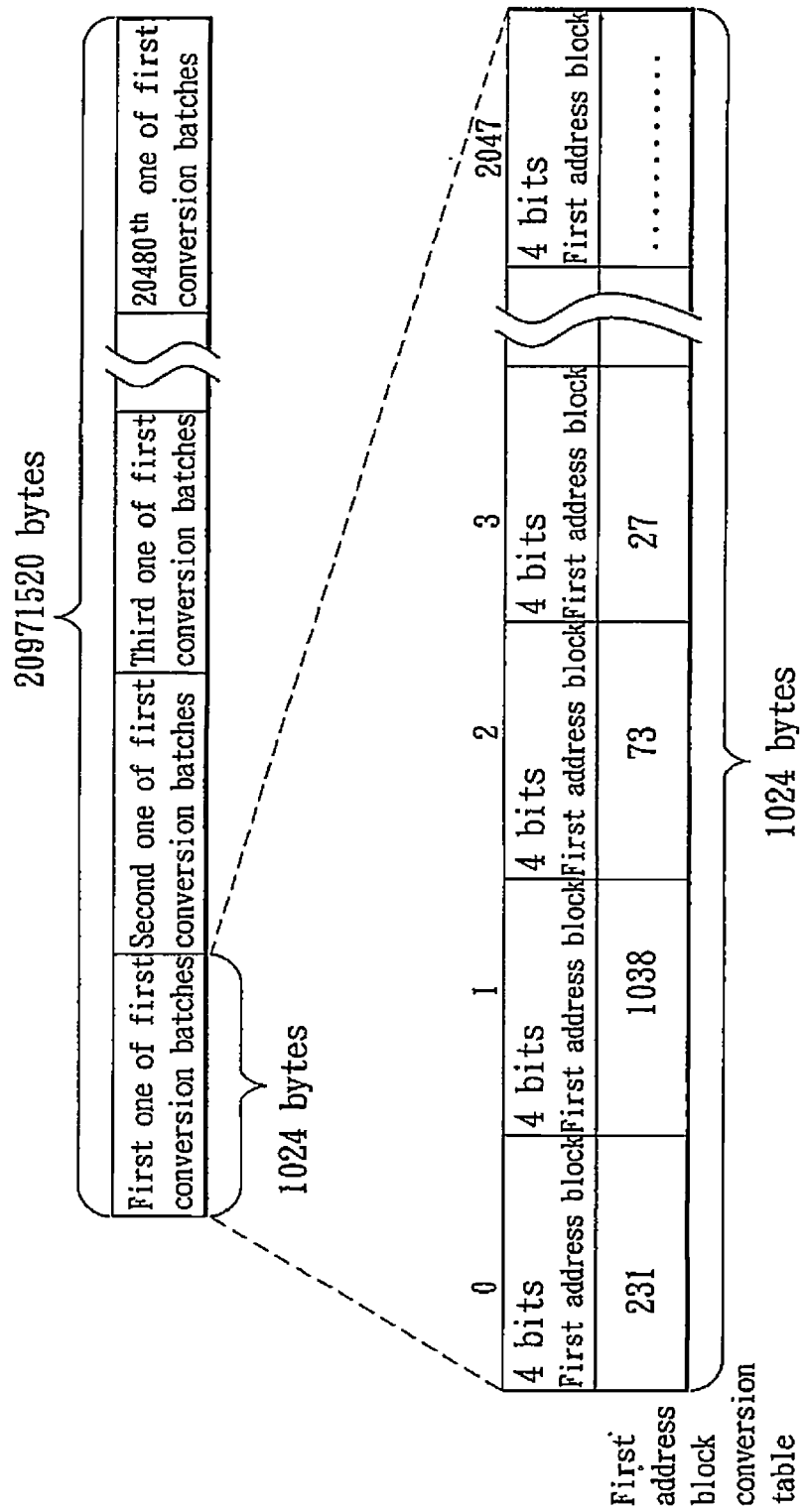
FIG. 10 is a schematic diagram to illustrate a first address conversion in the preferred embodiment.

In step 11 of FIG. 8, with 1024 bytes as a conversion batch (hereinafter referred to as the first conversion batch), the program divides protected addresses of 20971520 bytes into 20480 (20971520 bytes/1024 bytes) first conversion batches, i.e., 0~1023, 1024~2047, 2048~3071, .... Then, with 4 bits as one conversion unit (hereinafter referred to as the first conversion unit), the address range of each of the first conversion batches is converted into 2048 (1024 bytes/4 bits) address blocks (hereinafter referred to as the first address blocks) as shown in FIG. 3. Using the first one of the first conversion batches 0~1023 as an example, the first address blocks can be represented as an address sequence [0, 1, 2, 3, ..., 2047]. Subsequently, step 12 is carried out, in which an address block rearranging rule (hereinafter referred to as the first address block rearranging rule) is generated using the address range [0, 1, 2, 3, 2047] as a parameter. For example, an irreproducible random number sequence arranging scheme is used. Information, such as utilization rate of a computer processor, hard disk access speed, network access data amount, etc., within a period of time is acquired so as to generate a random number sequence, and the range of the random number sequence is adjusted to 0~2047, e.g., [231, 1038, 3, 49, 26, 322, ...,]. Thereafter, the $i^{th}$ address in the address sequence is exchanged with the address at the $i^{th}$ position in the random number sequence. For example, the $0^{th}$ address in the address sequence, i.e., "0," is exchanged with the address at the $0^{th}$ position in the random number sequence, i.e., "231." The 1st address in the address sequence, i.e., "1," is exchanged with the address at the 1st position in the random number sequence, i.e., "1038." Accordingly, an address block conversion table (hereinafter referred to as the first address block conversion table) [231, 1038, 73, 27, ...] as shown in FIG. 10 is generated. The first address block conversion table of the second one of the first conversion batches is a translation (addition) of the numerical values of the first one of the first address block conversion tables with 2048, so on and so forth. Thus, the respective first address block conversion tables of all the first conversion batches (20480 batches) can be obtained.

Since the aforesaid random number sequence cannot be reproduced, the program must permit storage of the random number sequence or the first address block conversion tables to facilitate future use of the same for address conversion to access data.

2. Second Address Conversion

Figure 11:
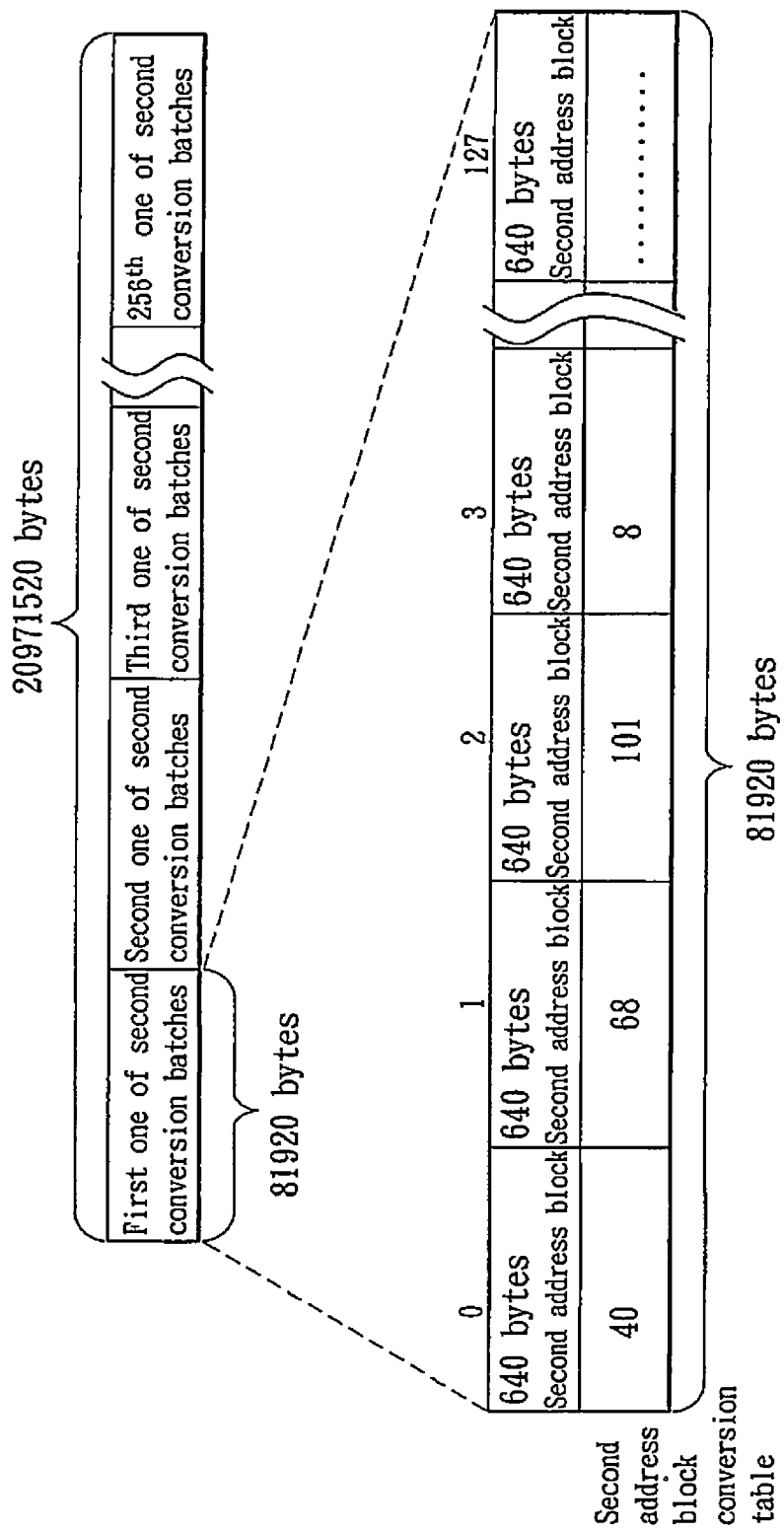
FIG. 11 is a schematic diagram to illustrate a second address conversion in the preferred embodiment.

In step 13, with 81920 bytes as one conversion batch (hereinafter referred to as the second conversion batch), as shown in FIG. 11, the program divides the 20971520 bytes of the protected addresses into 256 (20971520 bytes/81920 bytes) second conversion batches, i.e., 0~81919, 81920~163839, 163840~245759, .... Subsequently, using 640 bytes as one conversion unit (hereinafter referred to as the second conversion unit), the address range of each of the second conversion batches is converted into 128 (81920 bytes/640 bytes) address blocks (hereinafter referred to as the second address blocks), as shown in FIG. 11. Using the first one of the second conversion batches 0~81919 as an example, the converted second address blocks can be represented as an address sequence [0, 1, 2, 3, . . . 127]. Thereafter, step 14 is carried out to generate an address block rearranging rule (hereinafter referred to as the second address block rearranging rule) using the address range [0, 1, 2, 3, . . . , 127] as a parameter. For example, an encryption sequence arranging scheme, which employs a data encryption standard (DES for short) to rearrange the address sequence [0, 1, 2, 3, . . . , 127], is used. First, the address sequence [0, 1, 2, 3, . . . ,] is expressed in binary form as a binary number sequence [0000000, 0000001, 0000010, 0000011, . . . ]. Subsequently, using a DES calculation process, the binary number sequence [0000000, 0000001, 0000010, 0000011, . . . ] is encrypted using a code, e.g., "1h%j9~&f", into [0101000, 1000100, 1100000, 0011000, . . . ], which, when expressed in decimal form, becomes [40, 68, 96, 24, . . . ]. Thereafter, the $i^{th}$ address in the address sequence is exchanged with the address at the $i^{th}$ position in the number sequence. For example, the $0^{th}$ address in the address sequence, i.e., "0," is exchanged with the address at the $0^{th}$ position in the number sequence, i.e., "40". The $1^{st}$ address in the address sequence, "1," is exchanged with the address at the $1^{st}$ position in the number sequence, i.e., "68". In this way, an address block conversion table (hereinafter referred to as the second address block conversion table) [40, 68, 101, 8, . . . ] as shown in FIG. 11 can be obtained. The second address block conversion table of the second one of the second conversion batches is a translation (addition) of the numerical values of the first one of the second address block conversion tables with 128, so on and so forth. Thus, the respective second address block conversion tables of all the second conversion batches (256 batches) can be obtained.

Furthermore, since the aforesaid number sequence is generated using an encryption process, the program must permit storage of the encrypt ion code to facilitate future use of the same for address conversion to access data.

3. Third Address Conversion

Figure 12:
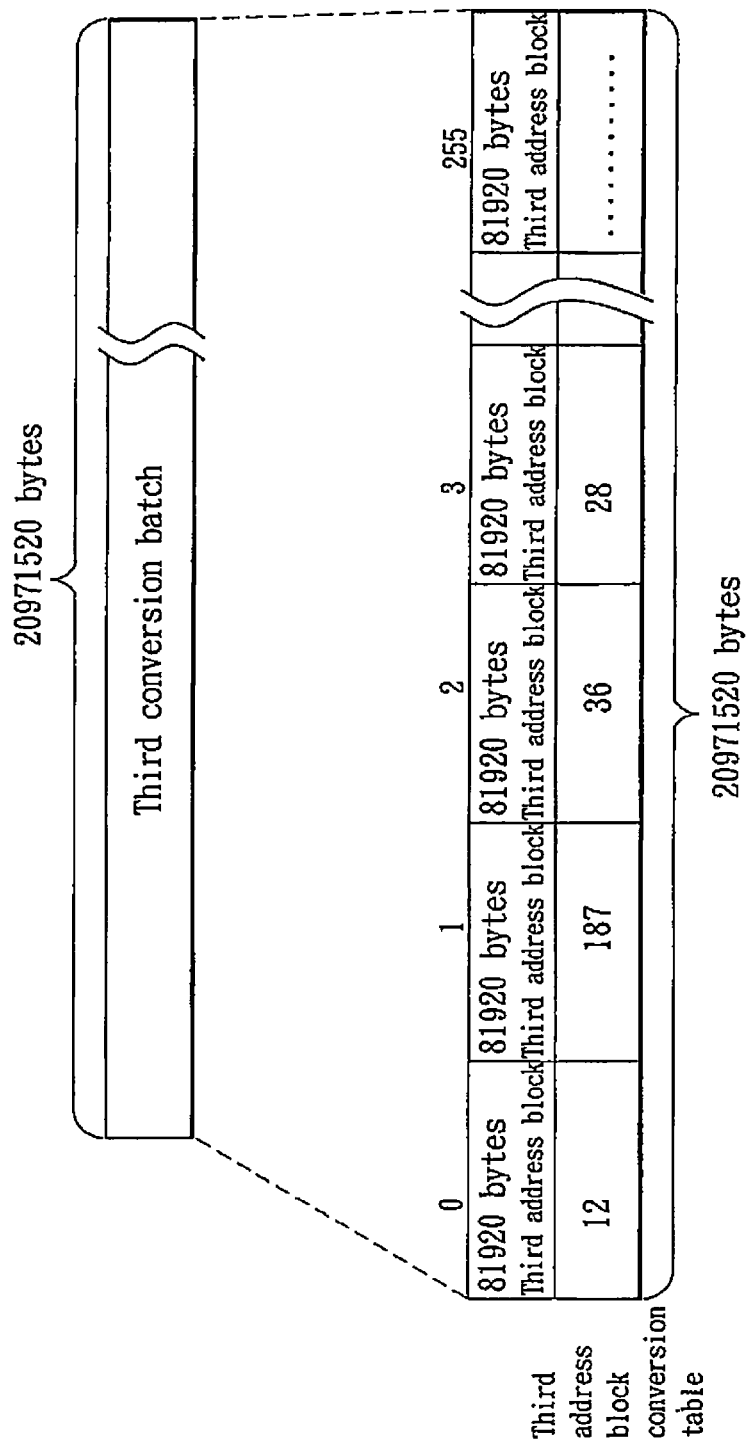
FIG. 12 is a schematic diagram to illustrate a third address conversion in the preferred embodiment.

In step 15, the program sets the conversion batch for a third conversion (hereinafter referred to as the third conversion batch) to be 20971520 bytes (i.e., size of the range of the protected addresses) and, with 81920 bytes as one conversion unit (hereinafter referred to as the third conversion unit), the third conversion batch of 20971520 bytes is converted into 256 (20971620 bytes/81920 bytes) address blocks (hereinafter referred to as the third address blocks). Therefore, the converted third address blocks can be expressed as an address sequence [0, 1, 2, 3, . . . , 255]. Subsequently, step 16 is carried out to generate an address block rearranging rule (hereinafter referred to as the third address block rearranging rule) using the address range [0, 1, 2, 3, . . . , 255] as a parameter. For example, a reproducible random number sequence arranging scheme can be used, which employs a computer function Rand with a seed, e.g., 27498, and the random number sequence is adjusted to be one in a range from 0 to 255, e.g., [12, 187, 3, 49, 26, 244, . . . , ]. Thereafter, the $i^{th}$ address in the address sequence is exchanged with the address at the $i^{th}$ position in the random number sequence. For example, the $0^{th}$ address in the address sequence, i.e., "0," is exchanged with the address at the $0^{th}$ position in the random number sequence, i.e., "12". The $1^{st}$ address in the address sequence is exchanged with the address at the $1^{st}$ position in the random number sequence, i.e., "187". In this manner, an address conversion table (hereinafter referred to as the third address conversion table) [12, 187, 36, 28, . . . ], as shown in FIG. 12, can be obtained.

In addition, since the aforesaid random number sequence is generated using the reproducible random number sequence arranging scheme, the program must permit storage of the seed value of the computer function Rand so as to facilitate future use of the same for address conversion to access data.

Therefore, in step 21 of FIG. 9, when the program receives from an operating system of the computer a request to write data onto a storage device, e.g., to write data to the $2043^{rd}$~$2057^{th}$ byte-address batch of the storage device 30, since some of the addresses onto which the data is to be written are in a non-protected range, i.e., the $2043^{rd}$~$2047^{th}$ bytes, the program will first cause writing of data (by directly executing a data writing operation) to the non-protected range, before causing writing of data to the protected range, i.e., the $2048^{th}$~$2057^{th}$ bytes.

Furthermore, since the data in this embodiment has to be encrypted before storage, and since the amount of data that is processed during each decryption/encryption is 8 bytes, the program needs to adjust the write range to the $2048^{th}$~$2063^{rd}$ bytes (i.e., an integer multiple of 8 bytes), and encrypt and write the data in two operations. In addition, since the area, i.e., the $2048^{th}$~$2055^{th}$ bytes, to which data is written for the first time is a data area that needs to be updated entirely, the program does not need to first execute data reading. The write operation can be executed directly after encryption of the data.

For example, if the data to be written is:
0x75, 0x52, 0x21, 0x67, 0x45, 0x9A, 0xB5, 0xC3,
the encrypted data resulting from DES encryption of the data using an encryption code [9dY2aB] is:
0x9D, 0xC5, 0xF7, 0x11, 0x0A, 0x83, 0x17, 0x44.

Therefore, before writing the data to the storage device 30, in order to protect the encrypted data, the program according to this invention permits three address conversions to be performed on the address range, i.e., the $2048^{th}$~$2055^{th}$ bytes, to which data is written for the first time, according to the first, second and third address block rearranging rules generated above, so as to find the write addresses for the encrypted data.

Actual Access Operation (See FIG. 9)

1. First Address Conversion

Initially, in step 22, the program determines the first conversion batch to which the address batch 2048~2055 belongs, and learns that the address batch 2048~2055 belongs to the aforesaid first one of the first conversion batches, i.e., 0~1023 bytes. Therefore, the write address range, i.e., the $2048^{th}$~$2055^{th}$ bytes (a total of 8 bytes), is converted into sixteen address blocks based on the first conversion unit (i.e., 4 bits), which are expressed as an address sequence [0, 1, 2, . . . , 15]. Subsequently, step 23 is performed to locate the rearranged address sequence [231, 1038, 73, 23, . . . ] (hereinafter referred to as the first address sequence) to which address sequence [0, 1, 2, . . . , 15] corresponds based on the first address block conversion table generated in accordance with the first address block rearranging rule.

2. Second Address Conversion

First, in step 24, the program determines the second conversion batch to which the values in the first address sequence belong. Supposing all the values in the first address sequence [231, 1038, 73, 23, . . . ] after conversion fall within 0~1280 (1280=640 bytes/4 bits), it can be known that the 0~1280 address batch belongs to the first one of the second conversion batches in the second address conversion, and is located within the address range of the first one of the second address blocks, i.e., [0], in the second block address sequence [0, 1, 2, . . . , 127]. In step 24, the program learns from the second address block conversion table generated based on the second address block rearranging rule that the value in the second address block conversion table [40, 68, 101, 8, . . . ] to which the first one of the second address blocks, [0], corresponds is [40]. Therefore, the addresses in the first address sequence are translated to the address range of the fortieth second address block, i.e., 51200 (40×1280 bytes) is added to each of the values in the first address sequence [231, 1038, 73, 23, . . . ], in which the address range of each of the second blocks is 1280 bytes. Thus, a second address sequence [51431, 52238, 51203, 51202, . . . ] can be obtained.

3. Third Address Conversion

Similarly, in step 25, the program first determines the third conversion batch to which the values in the second address sequence [51431, 52238, 51203, 51202, . . . ] belong, and finds that all the values in the second address sequence [51431, 52238, 51203, 51202, . . . ] fall within 0~163840 (163840=81920 bytes/4 bits), i.e., the range of the first one of the third address blocks, i.e., [0], in the third address block sequence [0, 1, 2, 3, . . . , 255] of the third conversion batch. Moreover, it can be known from the third address block conversion table [12, 187, 36, 28, . . . ] generated based on the third address block rearranging rule that the value in the third address block conversion table [12, 187, 36, 28, . . . ] to which the first one of the third address blocks, i.e., [0], corresponds is [12]. Therefore, the addresses of the second address sequence are translated to the address range of the twelfth one of the third address blocks of the third conversion batch, i.e., 1966080 (12×163840 bytes) is added to each of the values in the second address sequence [231, 1038, 73, 23, . . . ], in which the address range of each of the third address blocks is 163840 bytes. Thus, a third address sequence [2017511, 2018318, 2017283, 2017282, . . . ] can be obtained.

Finally, in step 26, the program converts the addresses in the third address sequence into the addresses to which data is to be actually written in the storage device 30 based on a storage unit of the storage device 30. For example, assuming that the storage unit of the storage device 30 is 512 bytes (1 sector), the addresses in the third address sequence which correspond to the write addresses of the storage device 30 are [1970.xx, 1971.xx, 1970.xx, 1970.xx, . . . ], respectively, in which 1970.xx means 2017511/1024 (512 bytes/4 bits)= 1970 . . . 231 (remainder), i.e., the 231st address of the 1970 sector.

Subsequently, after the encrypted 8-byte data is divided into 16 data blocks in write units of 4 bits, the data is written to the write addresses [1970.xx, 1971.xx, 1970.xx, 1970.xx, . . . ] of the storage device 30 in sequence (i.e., each data block is stored in the first four bits or last four bits of each write address).

After completing the first data writing, the program processes the second data writing. Since the data in the $2058^{th}$~$2063^{rd}$ bytes of the $2056^{th}$~$2063^{rd}$ bytes of the second data writing range is not to be updated, the program must first read the data on the $2056^{th}$~$2063^{rd}$ bytes, decrypt the data, update the data in the $2056^{th}$~$2057^{th}$ bytes, and encrypt all the data once again. Thereafter, the rearranged addresses (i.e., the third addresses) of the $2056^{th}$~$2063^{rd}$ byte-address batch after address conversion are found according to the above-described method, and are converted into actual write addresses of the storage device 30. Subsequently, the encrypted data is written to the storage device 30.

From the foregoing description, it is apparent that in the digital information protecting apparatus of this embodiment, the protected address range of the storage device 30 undergoes multiple conversions (three conversions in this embodiment, but may be two conversions or just one basic conversion) using different conversion rules to be remapped to different addresses, so that the data written to the protected address range can be scattered and distributed to non-consecutive addresses in the protected address range. Thus, even if the data stored in the storage device 30 is stolen, the scattered data cannot be recomposed into the original encrypted data, thereby affording full and strong protection to the data stored in the storage device 30.

Figure 13:
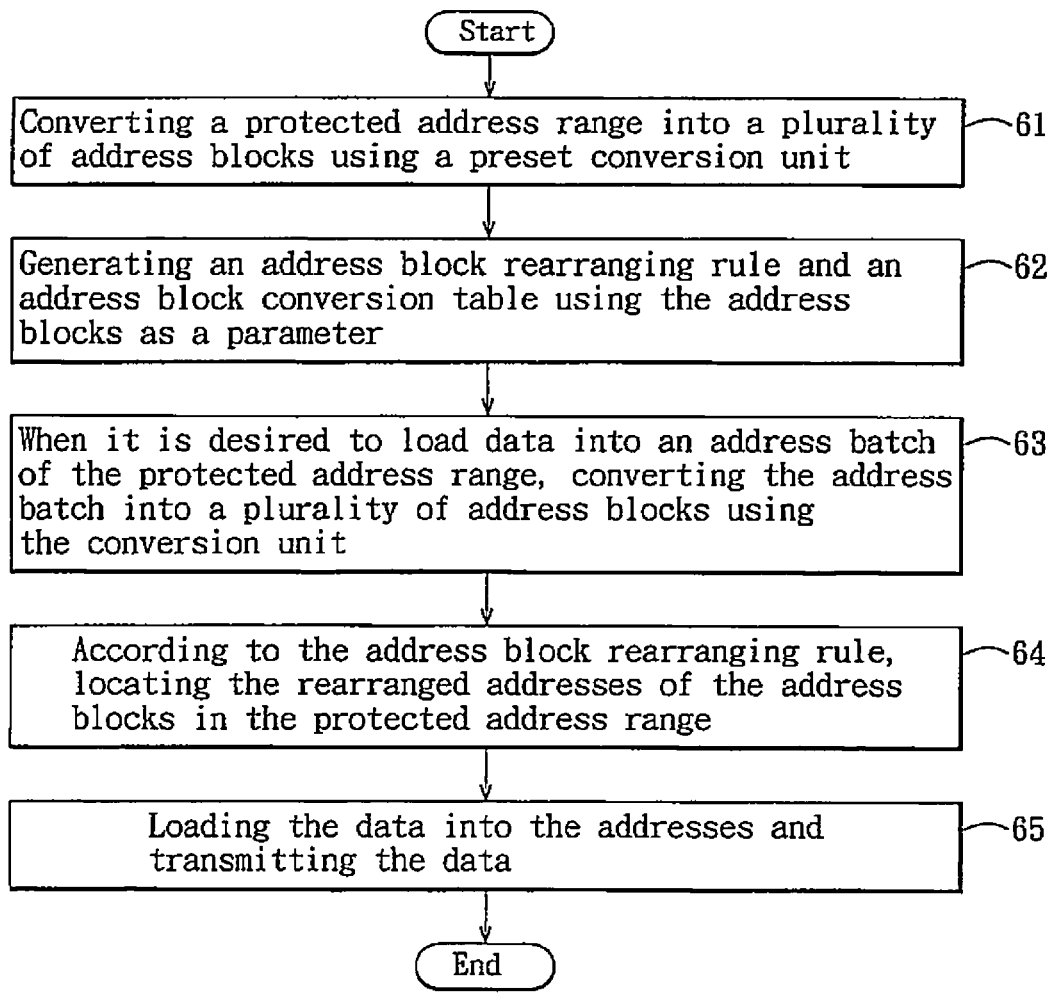
FIG. 13 is a flowchart to illustrate still another preferred embodiment of a digital information protecting method according to the present invention.

FIG. 13 shows another preferred embodiment of the digital information protecting method according to the present invention, which is applied to a server end and a client end that transmit data over a wired or a wireless network so as to provide protection to segments of data transmitted by a transmitting end (the server end or the client end). Therefore, the digital information protecting method of this embodiment is realized in the form of a computer software program in a computer accessible recording medium of a digital information protecting device (such as a computer system) disposed at the server end and/or the client end so as to protect digital information transmitted to the server end from the client end, and/or digital information transmitted to the client end from the server end.

Using an example where the preset data unit is 1 byte and the unit data amount transmitted is 8 bytes, when the server end and the client end need to transmit data to each other, a communication connection has to be established first. After the communication connection is established, identity authentication, protected zone begin and end signal communication, storage space address conversion rule and code communication, data encryption/decryption and code communication are performed. The identity authentication procedure is described briefly herein below using a conventional authentication method.

During identity authentication, each of the server end and the client end has its own public-key infrastructure (PKI). The client end will first generate a random sequence signal as an identity authentication value. For example, with a current utilization rate of the CPU as a seed value, eight consecutive bytes, such as [32, 145, 204, 9, 158, 3, 222, 68], are acquired using a Rand function, and values of two consecutive 16 bytes are acquired using the Rand function as the protected zone begin signal, such as [129, 33, 56, 188, 7, 8, 251, 2, 139, 193, 6, 88, 27, 18, 201, 12], and the end signal, such as [42, 111, 2, 38, 107, 248, 51, 72, 10, 31, 176, 238, 9, 45, 35, 142]. Moreover, an address conversion rule is set using a preset conversion scheme (to be described hereinafter), and an address conversion code is set to be the values of four consecutive bytes, such as [13, 213, 6, 88], which are acquired using the Rand function. A preset DES (digital encryption standard) is used for data encryption/decryption. The encryption code is values of eight consecutive bytes acquired using the Rand function, e.g., [6, 23, 145, 231, 255, 9, 83, 121].

Therefore, after the client end has established and set the transmission begin and end signals, and the address conversion rule and conversion code, such data is encrypted with a public key of the server end which was obtained from certificate authorities or pre-stored in the client end, and is transmitted to the server end.

After the server end has received the aforesaid data, the server end decrypts the received data using a private key thereof, encrypts the identity authentication value (random sequence signal) obtained from decryption with a public key of the client end which was obtained from the certificate authorities or pre-stored in the server end, and transmits the same to the client end.

After the client end has received the confirmation data from the server end, the client end decrypts the data with a private key thereof, and compares the identity authentication value (random sequence signal) obtained from decryption with the identity authentication value generated previously so as to confirm the identity of the server end.

The same confirmation procedure is initiated and confirmed at the server end but in a reverse direction from the server end to the client end. Thereafter, each of the client end and the server end can send the protected zone begin signal thereof, and protect the data using data encryption and the address conversion rule before transmission. When the server end or client end receives the protect zone begin signal from the counterparty, the received data must be converted using a scheme specified in a communication procedure, and the data must be decrypted to obtain the correct data.

In addition, when transmitting a protected data string, the number of bytes of effective data sent must be recorded in a field at the beginning of the string, and the amount of data transmitted must be an integer multiple of the unit data amount of 8 bytes, deficiency being compensated for by a random number or any other arbitrary number. For example, when data of 59 bytes is to be transmitted, the first two bytes of the data string must be used to record the number 59, and three bytes of blank data must be added to the end of the data string (i.e., 59+2+3=64) to constitute eight sets of 8-byte data.

The step of encryption is the same as that described hereinabove, and will not be repeated herein for the sake of brevity. Suppose these eight sets of data are encrypted into (0x23, 0x43, 0xF6, 0xA8, 0x07, 0x8D, 0x51, 0x92) ( . . . ) ( . . . ) ( . . . ) ( . . . ) ( . . . ) ( . . . ) ( . . . ).

Figure 14:
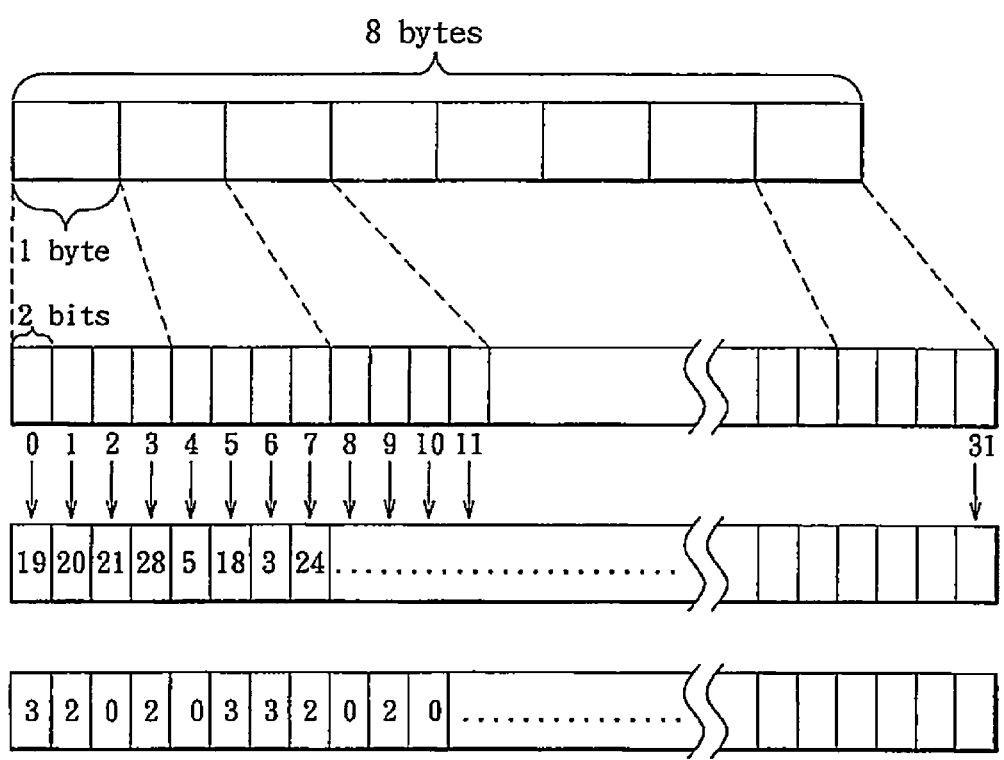
FIG. 14 is a schematic diagram to illustrate address conversion in the preferred embodiment.

The digital information protection method of this embodiment is as shown in step 61 of FIG. 13. First, as shown in FIG. 14, the program permits conversion of a protected address range to be protected, i.e., the 8-byte address range of each data set of this embodiment at a preset conversion unit, e.g., 2 bits, into 32 address blocks (8 bytes/2 bits). Subsequently, in step 62, the program uses the address blocks as a parameter to generate an address block rearranging rule which, in this embodiment, employs a modified congruential method (see D. E. Knuth, The Art of Computer Programming, Vol., 2: Seminumerial Algorithms, Chapter 3, Addison-Wesley, 1969) as the random sequence generating method, in which according to a preset address conversion code [13, 213, 6, 88], a prime number Prm1 is selected to be the thirteenth prime number, i.e., 443, from 373 (a randomly selected value, which should not be too large, in order that a computed value of a prime number calculating equation {$Rm[i+1]=MOD(Mult \ldots)$} that is decided after successively selecting the prime numbers [443, 1871, 401, 947] will not be greater than a numerical value range of the processor). Prime number Prm2 is the $213^{th}$ prime number, 1871, from 373. Pls is the $6^{th}$ prime number, 401, from 373. The initial value Rm[0] of the random number sequence is the $88^{th}$ prime number, 947, from 373.

The random number sequence values are calculated as follows:

Mult=Prm1×Prm2+1=165240

Div=Prm1×Prm2×Prm2=61634147

Rm[i+1]=MOD(Mult×Rm[i]+Pls,Div)=Mod(165240× Rm[i]+401, 61634147)

Rm=[947, 33214387, 9420372, 51887196, 37346565, 27432626, 22145379, 21484824, 25450961, 34043790, 47263311, 3475377, 25948282, . . . ]. A total of 32 values are acquired.

The values of Rm are each divided by 32 to obtain remainders Rma: [19, 19, 20, 28, 5, 18, 3, 24, 17, 14, 15, 17, 26, . . . ], a total of 32 values.

Subsequently, value of the Rma $[i]^{th}$ address is stored at the $[i]^{th}$ address in sequence. If the value of Rma[i] has already been used, an incremented value (incremented progressively to a value that has never been used before and that is a remainder of 32) of Rma[i] is stored at the $[i]^{th}$ address. Thus, an address block conversion table RM as shown in FIG. 14 can be obtained, which is [19, 20, 21, 28, 5, 18, 3, 24, 17, 14, 15, 22, 26 . . . ].

Therefore, after the aforesaid address conversion rule and the address block conversion table RM have been constructed, in step 63, when it is desired to load the first set of encrypted data into an address batch (i.e., the 8-byte protected address range), the 8-byte address space is first converted into 32 address blocks using 2 bits as one conversion unit. Thereafter, based on the address block conversion table RM, the addresses of the address blocks in the address batch are rearranged. Subsequently, the first set of encrypted data is split into 32 data blocks using 2 bits as one storage unit, which are expressed in the decimal system into [0, 2, 0, 3, 1, 0, 0, 3, 3, 3, 1, 2, 2, 2, 2, 0, 0, 0, 3, 3, 2, 0, 3, 1, 2, 2, 0, 1, 2, 1, 0, 2]. In step 65, the 32 data blocks are stored in sequence into the rearranged 32 address blocks. Therefore, as shown in FIG. 14, the first set of encrypted data, after being stored in the rearranged 32 address blocks, become [3, 2, 0, 2, 0, 3, 3, 2, 0, 2, 0, 3, 0 . . . ]. Similarly, the second to eight sets of encrypted data are rearranged using the aforesaid address conversion scheme, and the data are thereafter transmitted in the above-described manner.

It is apparent from the foregoing that, in this embodiment, by providing a digital information protecting apparatus at the transmitting end to convert the address batch (i.e., the aforesaid protected address range) taken up by the unit data amount to be transmitted into a plurality of address blocks based on a conversion unit, by generating an address conversion rule based on the address blocks, and by generating an address conversion table from the rule, before transmission of the data, the address batches occupied by the data are converted into a plurality of address blocks based on the conversion unit, and the addresses of the address blocks are rearranged according to the previously generated address conversion rule or the address conversion table. The data is thereafter loaded into the rearranged address blocks in sequence to form a data sequence, and is subsequently transmitted. In this way, since the data has been sufficiently scattered prior to transmission, the encrypted data cannot be recomposed into the original encrypted data even if intercepted during the process of transmission, thereby providing complete and strong protection during the process of transmission.

It is worth noting that it is preferred to select the size of the conversion unit to be smaller than a size of an address that can be accessed by a processor of the computer. For example, referring to FIG. 14, the 8-byte address range of each data set of this embodiment is converted using a preset conversion unit, e.g., 2 bits, into 32 address blocks (8 bytes/2 bits). Here the 8-byte address range has 8 addresses each having a size of 1 byte, and the 8 addresses constitute the 8-byte address range. Therefore, it is preferable to select the preset conversion unit to be 2 bits, 4 bits or 6 bits.

One advantage of such a configuration is that, when working with a smaller conversion unit, data stored in spaces of the address blocks are first fragmented by the conversion unit (since the size of the conversion unit is unable to handle all the data stored in a space of one address block) before being loaded separately into the rearranged addresses. In this manner, even though the data stored in the storage device is stolen, it would not be likely to reassemble the scrambled ciphertext data (i.e., data that is encrypted) to obtain the original plaintext data.

In a further embodiment, the computer 11 employs an 8-bit central processor unit (CPU) for executing instructions. The 8-bit CPU is able to access 8 bits (i.e., 1 byte) of data in a single instruction. For such a computer 11, the size of each conversion batch may be selected to be 128 bytes. Each of the conversion batch may be then converted into 128 address blocks having the protected address range represented by [0, 1, 2, 3, . . . , 127]. Accordingly, in this embodiment, 8 bits (i.e., 1 byte) is selected to be one conversion unit (to have a size identical to that of each address block). Preferably, the conversion unit has a size of (n) bits, where (n) is a positive integer but smaller than the size of an address.

In the preparation operation, the address block rearranging rule is generated using the above sequence [0, 1, 2, 3, . . . , 127] as a parameter. For example, the following random number sequence may be generated. [63, 11, 98, 34, 18, 43, 46, 1, 47, 48, 94, 49, 125, 50, 51, 4, 52, 53, 55, 20, 56, 19, 57, 117, 6, 15, 58, 8, 59, 126, 60, 123, 61, 106, 29, 62, 64, 22, 65, 111, 66, 5, 67, 127, 68, 76, 69, 30, 70, 71, 72, 90, 73, 75, 78, 79, 124, 80, 36, 97, 38, 81, 2, 82, 14, 83, 33, 84, 85, 86, 3, 87, 9, 44, 88, 89, 91, 92, 7, 93, 21, 107, 95, 37, 17, 96, 35, 99, 28, 100, 114, 10, 101, 122, 102, 103, 16, 104, 54, 105, 108, 31, 74, 109, 110, 112, 12, 23, 113, 77, 115, 0, 116, 27, 118, 24, 119, 32, 120, 26, 39, 45, 40, 41, 42, 121, 25, 13]

It is noted that, the encrypted data is fragmented into a plurality of encrypted data segments before being loaded into spaces of the rearranged address blocks, and each of the encrypted data segments has a size of 8 bytes. This is because the DES calculation process employed in this embodiment has an 8-byte block size (i.e., it operates on a fixed length string of 8 bytes).

When it is desired to retrieve the encrypted data, a data retrieval procedure may be performed. The succeeding paragraphs illustrate operations performed in the data retrieval procedure to obtain the data stored in, for example, spaces of the address blocks 19 and 20.

In this procedure, because the address block rearranging rule has been applied to rearrange the orders of the address blocks, the processor is required to look up the address block rearranging rule to acknowledge that the address blocks 16 to 23 in the original sequence now correspond respectively to the converted address blocks 52, 53, 55, 20, 56, 19, 57, and 117.

After the desired data is located, data in the above converted address blocks may be retrieved and decrypted for obtaining a decrypted data segment, which includes the data stored in spaces of the address blocks 19 and 20.

On the other hand, when it is desired to update data stored in the storage module, an update procedure may be performed. The succeeding paragraphs illustrate operations performed in the update procedure to update the following 4-byte plaintext data [0x21, 0x67, 0x45, 0x9A] into spaces of the address blocks 18 to 21, using the code [9dY2aB] for encryption.

Similar to the operations as done in the data retrieval procedure, the processor looks up the address block rearranging rule to acknowledge that the address blocks 16 to 23 in the original sequence now correspond respectively to the converted address blocks 52, 53, 55, 20, 56, 19, 57, and 117. As a result, data in the above converted address blocks are retrieved and decrypted for obtaining the decrypted data segment. For example, the decrypted data segment (containing plaintext) may be in the form of [0x75, 0x52, 0x71, 0x88, 0x29, 0x3A, 0x35, 0xC3]. The processor then writes the to-be-updated data into spaces of the address blocks 18 to 21, resulting in an updated data segment in the form of [0x75, 0x52, 0x21, 0x67, 0x45, 0x9A, 0xB5, 0xC3]. The updated data segment (containing plaintext) is then encrypted using the code [9dY2aB], resulting in an encrypted data segment in the form of [0x9D, 0xC5, 0xF7, 0x11, 0x0A, 0x83, 0x17, 0x44] (containing ciphertext). After that, the encrypted data segment is loaded into spaces of the converted address blocks 52, 53, 55, 20, 56, 19, 57 and 117, thus completing the update procedure.

It can be seen that in this embodiment, while the conversion unit has a size identical to that of the address blocks, the encrypted data is still relatively secure due to the following reasons. Because of the DES calculation process, 8 byte of the plaintext data is encrypted as one encrypted data segment and stored into spaces of 8 different address blocks, which are determined separately using the address block rearranging rule. In order for the data retrieval procedure to be complete, one must possess the address block rearranging rule so as to retrieve each and every address block included in the encrypted data segment, in addition to being able to reverse the DES calculation process to obtain the plaintext data from the correctly located ciphertext data.

The data loaded into the spaces of the rearranged addresses is encrypted using an encryption algorithm and an encryption code, and includes a plurality of encrypted data segments each having a size of (n) bytes.

Preferably, the encryption algorithm is configured to encrypt (n) bytes of the data at a time, where n is a positive integer larger than 2. In loading the data into spaces of the rearranged addresses, the processor is configured to load the encrypted data segments separately into spaces of the rearranged addresses.

Although in this embodiment, the DES calculation process is employed, other encryption algorithms having various block sizes, such as advanced encryption standard (AES) and the blowfish algorithm may be employed in other embodiments as well.

In addition, it is noted that although the digital information protecting method is realized in the form of a computer program software adapted to be stored in a computer system, the method of the present invention can also be implemented using an integrated circuit, an electronic circuit, or a once-programmable electronic circuit (or programmable logic circuit) that may or may not include a central processor, and that has logical computation capability.

Furthermore, in order to prevent unauthorized access to the address conversion scheme which may result in cracking of the encrypted data, the multiple (three) conversion procedures executed by the first preferred embodiment can be implemented and controlled by different devices. For instance, the code inputted by the user can be used as the conversion code in the first address conversion, the conversion table read from the chip card inserted into the computer system by the user is used to execute the second address conversion, and the network server controls and executes the third address conversion. Such a control scheme can be applied in the aforesaid preparation operation and actual access operation.

Furthermore, the address conversion rule, the address conversion table, or the conversion code generated in the above-described embodiments can be stored in a readable (or writable) storage medium that utilizes a magnetic property, optics, integrated circuit, electronic circuit, or electromagnetic waves, such as a magnetic card, CD, DVD, Smart Card, RamDisk, chip card, RF device, and IRED device. Certainly, the aforesaid conversion code may be inputted by the user via a keyboard or acquired from biological attributes of the user to thereby further prevent easy access to the address conversion scheme.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for protecting digital information, comprising:
   dividing, using a processor, a protected address range into a plurality of address blocks of a storage device based on a preset conversion unit, and generating an address block rearranging rule using the address blocks as a parameter;
   when it is desired to load data into a space of an address batch of the protected address range, dividing, using the processor, the address batch into a plurality of address blocks based on the conversion unit; and
   locating, using the processor, rearranged addresses of the address blocks in the protected address range according to the address block rearranging rule, and loading, using the processor, the data into spaces of the rearranged addresses;
   wherein, the conversion unit has a size of (n) bits, where (n) is a positive integer, and the size of the conversion unit is smaller than a size of an address that constitute the protected address range; wherein,
   an irreproducible random sequence arranging scheme is used as the address block rearranging rule, and includes utilizing operation information of internal hardware of a computer to generate a random number sequence ranging from 0 to the number of the address blocks, and exchanging an $i^{th}$ address block with an address block having an $i^{th}$ position in the random number sequence to thereby generate an address conversion table; and
   the rearranged addresses of the address blocks in the protected address range are located based on the address conversion table.

2. The method of claim 1, wherein the protected address range is the address storage space of the storage device, and prior to loading the data into the spaces of the rearranged addresses, each of the rearranged addresses is converted into an actual write address of the storage device according to a storage unit of the storage device.

3. The method of claim 1, wherein the size of the conversion unit is one of 1 byte, 4 bits and 2 bits.

4. The method of claim 1, wherein, an address conversion key inputted externally is accepted, and the address block rearranging rule is constructed using a number of the address blocks and the address conversion key.

5. The method of claim 4, wherein, the address block rearranging rule is to use a reproducible random sequence arranging scheme which includes utilizing a computer function Rand with a seed to generate a random number sequence ranging from 0 to the number of the address blocks, and exchanging and $i^{th}$ address block with an address block having an $i^{th}$ position in the random number sequence to thereby generate an address conversion table.

6. The method of claim 5, wherein the rearranged addresses of the address blocks in the protected address range are located according to the address conversion table.

7. The method of claim 1, wherein the data is encrypted data that is encrypted using an encryption algorithm and an encryption code.

8. A method for protecting digital information, comprising:
   dividing, using a processor, a protected address range into a plurality of first conversion batches, dividing, using the processor, an address range of each of the first conversion batches into spaces of a plurality of first address blocks of a storage device based on a first conversion unit, and generating, using the processor, a first address block rearranging rule for rearranging the first address blocks using the first address blocks as a parameter;
   dividing, using the processor, the protected address range into a plurality of second conversion batches,
   dividing, using the processor, an address range of each of the second conversion batches into spaces of a plurality of second address blocks based on a preset second conversion unit, and generating, using the processor, a second address block rearranging rule for rearranging the second address blocks using the second address blocks as a parameter;
   dividing, using the processor, the protected address range into at least one third conversion batch, dividing, using the processor, an address range of said at least one third conversion batch into spaces of a plurality of third address blocks based on a preset third conversion unit, and generating, using the processor, a third address block rearranging rule for rearranging the third address blocks using the third address blocks as a parameter; and
   when it is desired to load data into an address batch of the protected address range, determining, using the processor, the first conversion batch to which the address batch belongs, dividing, using the processor, the address batch into a plurality of address blocks based on the first conversion unit, locating rearranged addresses of the address blocks in the protected address range according to the first, second and third address block rearranging rules, and loading the data into the spaces of the rearranged addresses thus located.

9. The method of claim 8, wherein the data is encrypted data that is encrypted using an encryption algorithm and an encryption code.

10. A non-transitory computer accessible recording medium having a digital information protecting program recorded therein, the program being readable and executable to cause a computer to execute steps of a method for protecting digital information, the method comprising:
    dividing, using a processor, a protected address range into a space of a plurality of address blocks based on a preset conversion unit, and generating an address block rearranging rule using the address blocks as a parameter;
    when it is desired to load data into an address batch of the protected address range, converting, using the processor, the address batch into a plurality of address blocks based on the conversion unit; and
    locating, using the processor, rearranged addresses of the address blocks in the protected address range according to the address block rearranging rule, and loading, using the processor, the data into spaces of the rearranged addresses;
    wherein, the conversion unit has a size of (n) bits, where (n) is a positive integer, and the size of the conversion unit is smaller than a size of an address that constitute the protected address range; wherein,
    an irreproducible random sequence arranging scheme is used as the address block rearranging rile, and includes utilizing operation information of internal hardware of a computer generate a random number sequence ranging from 0 to the number of the address blocks, and exchanging an $i^{th}$ address block with an address block having an $i^{th}$ position in the random number sequence to thereby generate an address conversion table; and the rearranged addresses of the address blocks in the protected address range are located based on the address conversion table.

11. A non-transitory computer accessible recording medium, which has a digital information protecting program recorded therein, the program being readable and executable to cause a computer to execute steps of a method for protecting digital information, the method comprising:

dividing, using a processor, a protected address range into a plurality of first conversion batches, dividing, using the processor, an address range of each of the first conversion batches into spaces of a plurality of first address blocks of a storage device based on a first conversion unit, and generating, using the processor, a first address block rearranging rule for rearranging the first address blocks using the first address blocks as a parameter;

dividing, using the processor, the protected address range into a plurality of second conversion batches, dividing, using the processor, the protected address range of each of the second conversion batches into spaces of a plurality of second address blocks based on a preset second conversion unit, and generating, using the processor, a second address block rearranging rule for rearranging the second address blocks using the second address blocks as a parameter;

dividing, using the processor, the protected address range into at least one third conversion batch, dividing, using the processor, an address range of said at least one third conversion batch into spaces of a plurality of third address blocks based on a preset third conversion unit, and generating, using the processor, a third address block rearranging rule for rearranging the third address blocks using the third address blocks as a parameter; and when it is desired to load data into an address batch of the protected address range, determining, using the processor, the first conversion batch to which the address batch belongs, dividing, using the processor, the address batch into a plurality of address blocks based on the first conversion unit, locating rearranged addresses of the address blocks in the protected address range according to the first, second and third address block rearranging rules, and loading the data into the spaces of the rearranged addresses thus located.

12. A digital information protecting apparatus, which is loaded with a digital information protecting program, said digital information protecting apparatus being capable of reading and executing said digital information protecting program to perform steps of a method for protecting digital information, the method comprising:

dividing, using a processor, a protected address range into a space of a plurality of address blocks of a storage device based on a preset conversion unit, and generating an address block rearranging rule using the address blocks as a parameter;

when it is desired to load data into an address batch of the protected address range, converting, using the processor, the address batch into a plurality of address blocks based on the conversion unit; and locating, using the processor, rearranged addresses of the address blocks in the protected address range according to the address block rearranging rule, and loading, using the processor, the data into spaces of the rearranged addresses;

wherein, the conversion unit has a size of (n) bits, where (n) is a positive integer, and the size of the conversion unit is smaller than a size of an address that constitute the protected address range; wherein, an irreproducible random sequence arranging scheme is used as the address block rearranging rule, and includes utilizing operation information of internal hardware of a computer to generate a random number sequence ranging from 0 to the number of the address blocks, and exchanging an $i^{th}$ address block with an address block having an $i^{th}$ position in the random number sequence to thereby generate an address conversion table; and the rearranged addresses of the address blocks in the protected address range are located based on the address conversion table.

13. A digital information protecting apparatus, which is loaded with a digital information protecting program, said digital information protecting apparatus being capable of reading and executing said digital information protecting program to perform steps of a method for protecting digital information, the method comprising:

dividing, using a processor, a protected address range into a plurality of first conversion batches, dividing, using the processor, an address range of each of the first conversion batches into spaces of a plurality of first address blocks of a storage device based on a first conversion unit, and generating, using the processor, a first address block rearranging rule for rearranging the first address blocks using the first address blocks as a parameter;

dividing, using the processor, the protected address range into a plurality of second conversion batches, dividing, using the processor, an address range of each of the second conversion batches into spaces of a plurality of second address blocks based on a preset second conversion unit, and generating, using the processor, a second address block rearranging rule for rearranging the second address blocks using the second address blocks as a parameter;

dividing, using the processor, the protected address range into at least one third conversion batch, converting, using the processor, an address range of said at least one third conversion batch into spaces of a plurality of third address blocks based on a preset third conversion unit, and generating, using the processor, a third address block rearranging rule for rearranging the third address blocks using the third address blocks as a parameter; and when it is desired to load data into an address batch of the protected address range, determining, using the processor, the first conversion batch to which the address batch belongs, converting, using the processor, the address batch into a plurality of address blocks based on the first conversion unit, locating rearranged addresses of the address blocks in the protected address range according to the first, second and third address block rearranging rules, and loading the data into the spaces of the rearranged addresses thus located.

14. A method for protecting digital information, comprising:

converting, using a processor, a protected address range into a plurality of address blocks of a storage device based on a preset conversion unit, and generating an address block rearranging rule using the address blocks as a parameter;

when it is desired to load data into a space of an address batch of the protected address range, dividing, using the processor, the address batch into a plurality of address blocks based on the conversion unit; and locating, using the processor, rearranged addresses of the address blocks in the protected address range according to the address block rearranging rule, and loading, using the processor, the data into spaces of the rearranged addresses;

wherein, the data loaded into the spaces of the rearranged addresses is encrypted using an encryption algorithm and an encryption code, and includes a plurality of encrypted data segments each having a size of (n) bytes;

wherein the encryption algorithm is configured to encrypt (n) bytes of the data at a time, where n is a positive integer larger than 2;

wherein in loading the data into spaces of the rearranged addresses, the processor is configured to load the encrypted data segments separately into spaces of the rearranged addresses; wherein, an irreproducible random sequence arranging scheme is used as the address block rearranging rule, and includes utilizing operation information of internal hardware Of a computer to generate a random number sequence ranging from 0 to the number of the address blocks, and exchanging an $i^{th}$ address block with an address block having an $i^{th}$ position in the random number sequence to thereby generate an address conversion table; and the rearranged address of the address blocks in the protected address range are located based on the address conversion table.

15. The method of claim 14, wherein the protected address range is a storage address space of the storage device, and prior to loading the data into the rearranged addresses, each of the rearranged addresses is converted into an actual write address of the storage device according to a storage unit of the storage device.

16. The method of claim 14, wherein:

an irreproducible random sequence arranging scheme is used as the address block rearranging rule, and includes utilizing operation information of internal hardware of a computer to generate a random number sequence ranging from 0 to the number of the address blocks, and exchanging and $i^{th}$ address block with an address block having an $i^{th}$ position in the random number sequence to thereby generate an address conversion table; and the rearranged addresses of the address blocks in the protected address range are located based on the address conversion table.

17. The method of claim 14, wherein, an address conversion key inputted externally is accepted, and the address block rearranging rule is constructed using a number of the address blocks and the address conversion key.

18. The method of claim 17, wherein, the address block rearranging rule is to use a reproducible random sequence arranging scheme which includes utilizing a computer function Rand with a seed to generate a random number sequence ranging from 0 to the number of the address blocks, and exchanging and $i^{th}$ address block with an address block having an $i^{th}$ position in the random number sequence to thereby generate an address conversion table.

19. The method of claim 18, wherein the rearranged addresses of the address blocks in the protected address range are located according to the address conversion table.

20. A method for protecting digital information, comprising:

dividing, using a processor, a protected address range into a plurality of address blocks of a storage device based on a preset conversion unit, and generating an address block rearranging rule using the address blocks as a parameter;

when it is desired to load data into a space of an address batch of the protected address range, dividing, using the processor, the address batch into a plurality of address blocks based on the conversion unit; and locating, using the processor, rearranged addresses of the address blocks in the protected address range according to the address block rearranging rule, and loading, using the processor, the data into spaces of the rearranged addresses;

wherein, the address block rearranging rule is to use a reproducible random sequence arranging scheme which includes utilizing a computer function Rand with a seed to generate a random number sequence ranging from 0 to the number of the address blocks, and exchanging and $i^{th}$ address block with an address block having an $i^{th}$ position in the random number sequence to thereby generate an address conversion table; wherein, and address conversion key inputted externally is accepted, and the address block rearranging rule is constructed using a number of the address blocks and the address conversion key, and wherein;

an irreproducible random sequence arranging scheme is used as the address block rearranging rule, and includes utilizing operation information of internal hardware of a computer to generate a random number sequence ranging from 0 to the number of the address blocks, and exchanging an $i^{th}$ address block with an address block having an $i^{th}$ position in the random number sequence to thereby generate an address conversion table; and the rearranged addresses of the address blocks in the protected address range are located based on the address conversion table.

21. The method of claim 20, wherein the protected address range is a storage address space of the storage device, and prior to loading the data into the rearranged addresses, each of the rearranged addresses is converted into an actual write address of the storage device according to a storage unit of the storage device.

22. The method of claim 20, wherein the converting unit is one of 1 byte, 4 bits and 2 bits.

23. The method of claim 20, wherein, the rearranged addresses of the address blocks in the protected address range are located according to the address conversion table.

24. The method of claim 20, wherein the data is encrypted data that is encrypted using an encryption algorithm and an encryption code.

* * * * *